United States Patent
Salou et al.

(10) Patent No.: US 11,212,485 B2
(45) Date of Patent: Dec. 28, 2021

(54) TRANSPARENCY SYSTEM FOR COMMONPLACE CAMERA

(71) Applicant: Orange, Issy-les-Moulineaux (FR)

(72) Inventors: Catherine Salou, Chatillon (FR); Jacques Chodorowski, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/499,110

(22) PCT Filed: Mar. 27, 2018

(86) PCT No.: PCT/FR2018/050745
§ 371 (c)(1),
(2) Date: Sep. 27, 2019

(87) PCT Pub. No.: WO2018/178563
PCT Pub. Date: Oct. 4, 2018

(65) Prior Publication Data
US 2020/0036939 A1    Jan. 30, 2020

(30) Foreign Application Priority Data
Mar. 30, 2017    (FR) ...................................... 1752712

(51) Int. Cl.
*H04N 7/14*    (2006.01)
*H04N 5/232*    (2006.01)
(52) U.S. Cl.
CPC ......... *H04N 7/142* (2013.01); *H04N 5/23203* (2013.01); *H04N 5/23238* (2013.01); *H04N 5/23296* (2013.01)

(58) Field of Classification Search
CPC .......... H04N 5/23203; H04N 5/23238; H04N 5/23296; H04N 5/222; H04N 5/2251; H04N 7/142; H04N 7/15; G06F 3/0304
See application file for complete search history.

(56) References Cited

U.S. PATENT DOCUMENTS

| | | | |
|---|---|---|---|
| 9,479,732 B1 * | 10/2016 | Saleh ................. | H04N 5/23238 |
| 2002/0122113 A1 * | 9/2002 | Foote ....................... | G06T 7/97 348/48 |

(Continued)

FOREIGN PATENT DOCUMENTS

JP    2007049616 A    2/2007

OTHER PUBLICATIONS

English translation of the Written Opinion of the International Searching Authority dated Jun. 11, 2018 for corresponding International Application No. PCT/FR2018/050745 filed Mar. 27, 2018.

(Continued)

*Primary Examiner* — Lin Ye
*Assistant Examiner* — John H Morehead, III
(74) *Attorney, Agent, or Firm* — David D. Brush; Westman, Champlin & Koehler, P.A.

(57) ABSTRACT

A signaling device able to operate in association with a capturing device able to capture a scene. The signaling device includes: an obtaining module able to obtain a first observation direction from the scene captured by the capturing device, a determining module able to determine a first field of observation associated with the first observation direction, and a signalling module able to signal the first observation field using first signage based on at least one sensorial indicator.

20 Claims, 8 Drawing Sheets

(56) References Cited

U.S. PATENT DOCUMENTS

| | | | |
|---|---|---|---|
| 2004/0001145 A1* | 1/2004 | Abbate | H04N 5/23293 |
| | | | 348/207.99 |
| 2008/0002962 A1* | 1/2008 | Ito | G03B 37/06 |
| | | | 396/287 |
| 2008/0112700 A1 | 5/2008 | Foxenland et al. | |
| 2010/0177160 A1* | 7/2010 | Tocher | G02B 13/06 |
| | | | 348/36 |
| 2010/0328461 A1 | 12/2010 | Renkis | |
| 2013/0226344 A1* | 8/2013 | Wong | G05D 1/0242 |
| | | | 700/258 |
| 2016/0127641 A1* | 5/2016 | Gove | G06T 1/0007 |
| | | | 348/143 |
| 2016/0286119 A1* | 9/2016 | Rondinelli | G02B 13/06 |
| 2017/0140791 A1* | 5/2017 | Das | G06T 7/13 |

OTHER PUBLICATIONS

International Search Report dated Jun. 1, 2018 for corresponding International Application No. PCT/FR2018/050745 filed Mar. 27, 2018.

Written Opinion of the International Searching Authority dated Jun. 1, 2018 for corresponding International Application No. PCT/FR2018/050745 filed Mar. 27, 2018.

\* cited by examiner

TRANSPARENCY SYSTEM FOR COMMONPLACE CAMERA

CROSS-REFERENCE TO RELATED APPLICATIONS

This Application is a Section 371 National Stage Application of International Application No. PCT/FR2018/050745, filed Mar. 27, 2018, the content of which is incorporated herein by reference in its entirety, and published as WO 2018/178563 on Oct. 4, 2018, not in English.

FIELD OF THE INVENTION

The field of the invention is that of connected digital devices, in particular that of devices for capturing images or videos: webcam, surveillance camera, panoramic camera, etc.

The invention relates to a connected digital device, called signaling device hereinafter, able to be used in combination with a capturing device. The invention also relates to the corresponding method.

The signaling device and the capturing device may communicate with one another via a communication link. This link is of any type; it may be wired, for example an Ethernet, USB, etc. link. This link may also be wireless; such a wireless network is for example a Bluetooth connection, an Internet network, a Wi-Fi connection, etc.

Broadcasting images or videos from capturing devices makes it possible to implement interactive services, for example remote communication services, in real time, between people.

The invention is applicable in the field of video-conferencing, through personal assistance services (for example via household robots), remote training services, etc.

TECHNOLOGICAL BACKGROUND

To reduce geographical distances and maintain contact between people through a more "human" experience than a simple telephone call, cameras are increasingly being used for communications such as "video" calls. In the field of home automation or in the professional world, "rich" interactions between people are able to be performed in real time through image and sound.

Cameras, such as cameras embedded in laptop computers or webcams, are systems that have been used for several years to make video calls, in particular since the spread of voice over IP calls.

In the field of surveillance or remote assistance services, some of these cameras, having a single capturing lens, are able to be remotely controlled so as to cover a surveillance space broader than that enabled by the capturing lens alone. Sometimes, cameras, for example using motorized additional devices, perform rotational, translational, etc. movements in order to expand surveillance coverage, for example by being controlled by one or more remote observers. Thus, for a person situated close to a camera, these movements may in these cases be perceptible. As a result, if this person is concerned about being situated or not situated in the field of observation of a remote person, he is able to obtain answers on the basis of the orientation of the capturing lens of the camera.

Conventionally, in a number of videophone services, each of the two contact partners communicating in a video call simultaneously views two fields of observation on their computer screen: a first observation window comprising the other contact partner (often in primary viewing mode), and a second observation window comprising himself (in secondary viewing mode). This second window thus allows each contact partner to be ensured of his visibility (or lack thereof), of himself or of an element in the scene in which he is moving, to his contact partner.

New innovations nowadays propose "wide-angle" and even "panoramic" capturing devices, which are able to render audiovisual content from a scene covering up to 360 degrees around a point defined by the position of the camera itself. These devices have the special feature of being placed and moved (when they are not moving themselves by virtue of a mobile support) within a space, such as inside a home. For some cameras or capturing devices whose capturing lens or capturing lenses do not move or move in a manner that is barely or not perceptible, if a person situated in a scene captured by such a device is concerned, during communication with a remote contact partner, about being situated or not situated in the field of observation of this contact partner, he is not able to ascertain this; he is not able to ascertain where his contact partner is directing his gaze, and therefore to deduce to what his contact partner is paying attention; thereby possibly tarnishing the quality of this exchange time between these two contact partners. Specifically, the panoramic video mode offered by these what are known as "panoramic" systems no longer makes it possible to disassociate the captured audiovisual content from the direction of observation of a remote person; now, the field of observation, in the case of a human observer, is not physiologically able to be 360 degrees.

The invention offers a solution that does not exhibit the drawbacks of the prior art.

SUMMARY

To this end, according to a first hardware aspect, what is proposed is a signaling device, able to operate in combination with a capturing device able to capture a scene, the signaling device comprising:
an acquisition module able to acquire a first direction of observation of the scene captured by the capturing device,
a determination module able to determine a first field of observation associated with the first direction of observation,
a signaling module able to signal the first field of observation on the basis of a first sign based on at least one sensorial indicator.

The signaling device described here makes it possible to signal a field of observation associated with a direction of observation. By way of a sign implemented through one or more indicators, the device provides one or more people present in an observed space with information useful for improving the quality of experience of communication services. "Sign" is understood to mean a set of elements implemented through the signaling device so as to allow a person who takes note thereof to derive expected information therefrom. "Observed space" or "scene" is understood to mean the physical environment in which a capturing device is located. One or more people present in an observed space will be colloquially called one or more "observed parties" in the remainder of the document: specifically, these observed parties are potentially observed by one or more third parties by capturing the scene in which they are located. "Field of observation" is understood to mean a subspace determined by the signaling device on the basis of a direction of observation in an observed space.

A direction of observation is more generally associated with a direction of observation directed by a remote person, depending on an action or on behavior of this person, for example the gaze direction of this person. Although signaling of a field of observation may be limited to signaling of a direction of observation, signaling of a field of observation may signal, for example, rendering of a "real" field of observation of a human observer: for example, either using signaling of the volume of this field characterized by a set of two-dimensional subspaces in a three-dimensional space, or using signaling of the projection of the volume of this field with respect to a two-dimensional subspace; this projection is then characterized by two directions and a measurement of the angle formed by these two directions, and is called angle sector.

In parallel with an observed space, an "observation space" is defined as being a space in which an "observation" of an observed space is performed; this observation is performed either by an "observer" observing the observed space via a viewing device, or by a computer system connected in the same way to the device for capturing an observed space; in a communication situation, the observation space is generally distinct from the observed space.

In an observation space, a device for controlling a direction of observation, for example that of an observer, is generally coupled to the device for viewing the images/videos received from the capturing device.

The signaling device described here thus offers the advantage of allowing an observed party to know the field of observation of a control device through the space in which he is located/is moving. This invention thus makes it possible to provide the observed parties with knowledge of this information, and contributes to improving the communication techniques of remote services by characterizing the attention paid by a remote contact partner, in particular when using capturing devices that are defined as "ordinary". The term "ordinary" characterizes a capturing device or camera that, due to its technical and/or physical features, such as the concealment of its capturing lens underneath an opaque physical protector or the presence of a plurality of capturing lenses, results in a direction of observation that is difficult to interpret for a person situated in the space in which the capturing device is located. For example, a 360° camera is considered to be "ordinary", in contrast to a camera integrated above the screen of a laptop computer.

Numerous studies, in particular relating to video-conferencing services, have shown the importance, to a contact partner, of being able to confirm that attention is being paid by his contact partner in order to guarantee an optimal communication link. The enrichment of the communication mode provided by this invention, in particular in terms of user experience, is an advantage over the prior art.

Likewise, this invention contributes to better control of the broadcasting of the image of the observed parties in the context of using ordinary devices, and additionally with a low implementation cost.

According to one embodiment, the signaling device is able to signal the first field of observation on the basis of a first sign based on at least one visual indicator.

Advantageously, this embodiment allows an observed party, just by looking at the signaling device proposed here, to confirm a field of observation associated with a direction of observation directed from an observation space. In particular, a visual indicator may be an LED lighting component.

According to another embodiment, which may be implemented as an alternative or in addition to the previous one, the signaling device is furthermore able to acquire a first direction of observation of a device directed by an observer.

Advantageously, this embodiment makes it possible to signal a direction of observation directed by an observer so as to render it in the observed space. The control device used by the observer may be of any type: a device embedded in virtual glasses or a virtual reality headset device worn by this observer, or else a remote controller, joystick, etc. control device. In particular, the data processed by a device such as a virtual reality headset result from techniques or from a combination of techniques based on gyroscope, accelerometer, etc. devices or devices for detecting physiological features of a human operator (oculometric measurements, etc.).

According to another embodiment, which may be implemented as an alternative or in addition to the previous one, the signaling device is furthermore able to signal a moving entity contained in the first field of observation, on the basis of a second sign based on at least one sensorial indicator.

Advantageously, this embodiment makes it possible to signal, to an observed party, that he has entered or exited a field of observation determined by the signaling device. It is in particular beneficial when the observed parties wish to enter, stay in, or by contrast leave the field of view of a remote observer.

According to another embodiment, which may be implemented as an alternative or in addition to the previous ones, the signaling device is furthermore able to signal a second field of observation associated with a second direction of observation.

Advantageously, this embodiment makes it possible to simultaneously signal, through one and the same signaling device, two fields of observation relative to two different remote observations. The origin of the observations is able to be identified by observed parties, for example by virtue of different signs for each field of observation. It should be noted that the term "observer" does not refer solely to a human observer, but may be assigned to a machine; hence the use of the term "observation" to refer to one or the other of the cases.

Although it is shown on the same signaling device, the second field of observation is determined and signaled depending on the second direction of observation, independently of the first field of observation.

According to another embodiment, which may be implemented as an alternative or in addition to the previous ones, the signaling device is furthermore able to signal activation of a zoom in/zoom out function.

Advantageously, this embodiment makes it possible to signal an observation distance to the observed parties, using a sign dedicated to the zoom in/zoom out function. Zoom in or zoom out is understood to mean two techniques that are often integrated into capturing devices, that are known to those skilled in the art and that allow the user of these devices to continuously modify the field angle covered by the lens of the capturing device. An observation distance is associated with a direction of observation. An observation distance may be represented more or less accurately via a sign: for example, a visual sign associated with an observation distance may use the luminous intensity of visual indicators or else the display of data indicating this observation distance.

The signaling of the field of observation is in particular updated when a zoom in/zoom out function is activated.

According to another embodiment, which may be implemented as an alternative or in addition to the previous ones, the signaling device is furthermore able to signal the first field of observation on the basis of a first sign based on two indicators.

Advantageously, this embodiment makes it possible to divide an observed space into two relative spaces having two separate sectors of around 180 degrees. In this case, the implementation cost is very low given the limited means necessary for this sign. This sign is for example suitable for Ricoh Theta (registered trademark) panoramic cameras.

According to another embodiment, which may be implemented as an alternative or in addition to the previous ones, the signaling device is furthermore able to signal the first field of observation on the basis of a first sign based on four indicators.

Advantageously, this embodiment makes it possible to divide an observed space into four relative spaces having four separate sectors of around 90 degrees. In comparison with the previous embodiment, the amount of information provided to the observers is therefore greater, while still maintaining a low implementation cost.

According to another embodiment, which may be implemented as an alternative or in addition to the previous ones, the primary shape of the device is circular.

Advantageously, this embodiment makes it possible to create, on the cognitive level, an effective sign of a field of observation through the device described here. In the figures described hereinafter, this preferred embodiment has the advantages of being able to place a circular signaling device around the camera to which it is connected. For example, an LCD-screen viewing device may be considered to be an indicator moving on an annular support (or the support performing a rotation about itself); the position of the screen around the panoramic camera thus indicates the direction of observation, and the screen displays the corresponding field of observation.

According to another embodiment, which may be implemented as an alternative or in addition to the previous ones, the primary shape of the device is spherical.

Advantageously, this embodiment makes it possible to signal a solid angle relative to a field of observation, using for example a sphere formed uniformly of LED indicator lights on its surface. This sign also has the advantage of being able to place the signaling device around the camera (or else the lenses of the camera that are placed on the surface) and to signal, to the observed parties, the vertical component of the direction of observation.

According to another embodiment, which may be implemented as an alternative or in addition to the previous ones, the signaling device is furthermore able to signal the first field of observation on the basis of a first projected sign.

Advantageously, this embodiment allows any observed party, for example moving in an observed space, to maintain access to the information regarding the field of observation signaled by the signaling device by a means other than that of looking directly at the signaling device, in particular by virtue of using a light beam or a combination of light beams.

According to another aspect, the invention comprises a signaling method associated with a signaling device, able to operate in combination with a capturing device able to capture a scene, the method being characterized in that it comprises:
    acquiring a first direction of observation of the scene captured by the capturing device,
    determining a first field of observation associated with the first direction of observation,
    signaling the first field of observation on the basis of a first sign based on at least one sensorial indicator.

This signaling method makes it possible to perform the steps necessary to implement the sign conveyed by the signaling device.

The invention also comprises a computer program able to be implemented on a signaling device comprising code instructions that, when it is executed by a processor, performs the signaling method.

The invention also comprises a data carrier on which at least one sequence of program code instructions for executing the signaling method has been stored.

BRIEF DESCRIPTION OF THE DRAWINGS

The invention will be better understood on reading the following description, given by way of example and with reference to the appended drawings, in which:

FIG. 5b illustrates steps of the signaling method according to one particular embodiment of the signaling method described with reference to FIG. 5a.

DETAILED DESCRIPTION OF ILLUSTRATIVE EMBODIMENTS

In the following detailed description of embodiments of the invention, numerous specific details are presented in order to provide a more complete understanding. However, those skilled in the art realize that embodiments may be put into practice without these specific details. In other cases, well-known features are not described in detail so as to avoid needlessly complicating the description.

A signaling device presented hereinafter according to various embodiments is connected, via a communication network, to a capturing device located in an observed space and/or to one or more devices located in an observation space, such as a viewing device, a control device, etc.; the capturing device itself being connected to a communication network identical to or different from the previous one, making it possible in particular to send the video stream captured in the observed space to the observation space.

Figure 1:
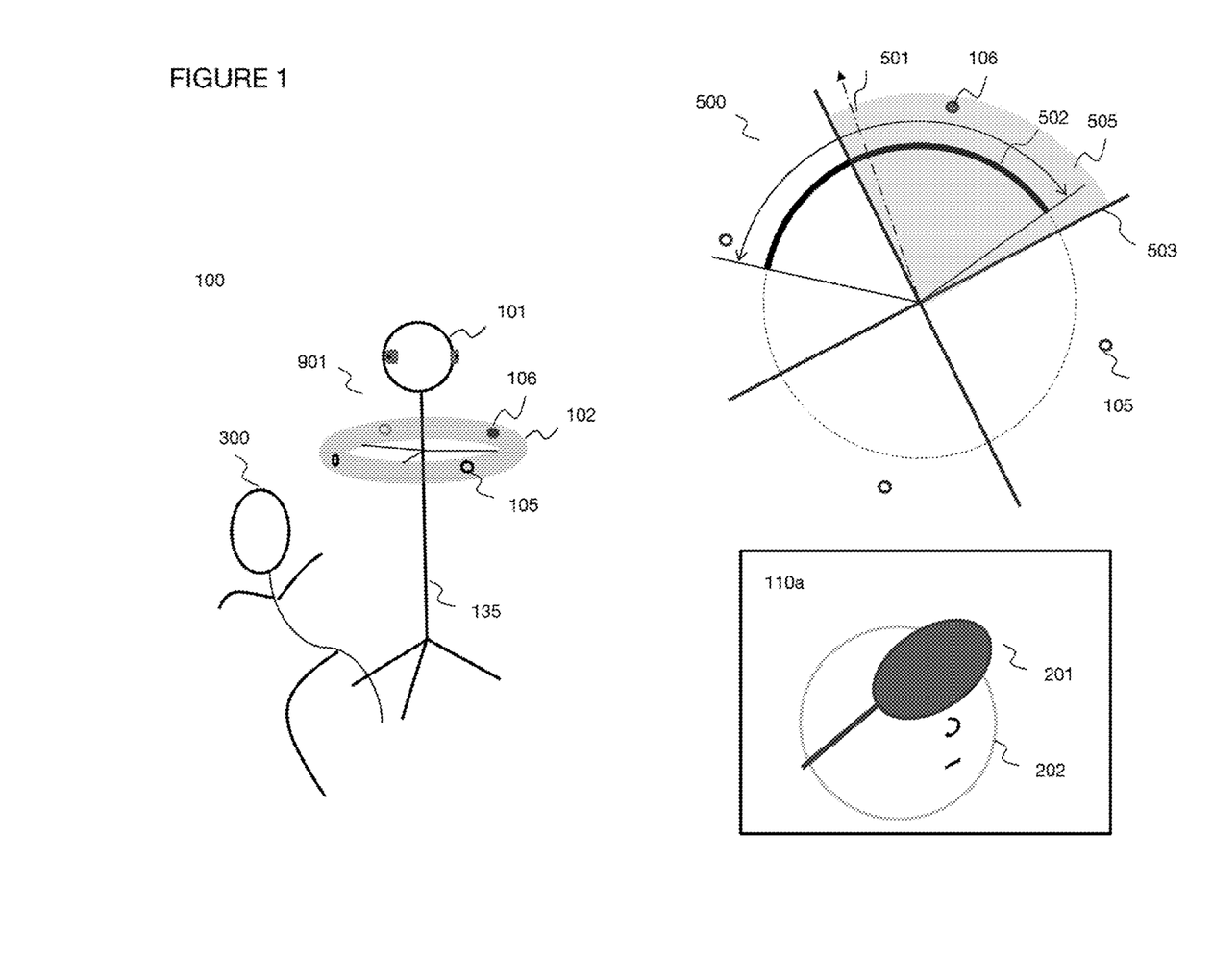
FIG. 1 illustrates an equipment incorporating a signaling device formed of four indicator lights.

FIG. 1 illustrates an equipment 901 describing one embodiment of the device for signaling a field of observation as described by the invention. The equipment 901 is formed of a signaling device 102, of a capturing device 101 and of a base 135. The signaling device 102 is formed here of four sensorial indicators, including 105 and 106. In our example, these sensorial indicators are indicator lights 105

(deactivated) and 106 (activated). Furthermore, in our example, the indicators 105 and 106 are arranged on a horizontal circular support rigidly fixed to a support arm base 135. The panoramic ordinary capturing device 101 is also positioned on this support arm. The signaling device 102 is in particular positioned symmetrically about the vertical axis of the capturing device 101. The equipment 901 is located in a space, defined beforehand as being an observed space and referenced 100. A person referenced 300, defined above as an observed party, is moving in this observed space.

In this embodiment, all four indicators are placed on a single element, the horizontal circular support. In addition, the signaling device 102 is situated close to the capturing device 101 so that an association, from the cognitive point of view of an observer, is made to a humanoid robot: the "eye" of the observer would be the center of the camera 101 and the direction of observation of this "eye" would be embodied by the horizontal direction formed by the center of the camera 101 and the location of the activated indicator 106.

By way of a diagram 500 that illustrates the division of the observed space 100 into four separate angle sectors defined by the reference frame 503, it is observed that a direction of observation 501, called first direction of observation and associated with a field of observation 502 called first field of observation, is contained within one of the four angle sectors. The indicator 106 is thus turned on, the only one out of the four indicators since it signals the angle sector referenced 505 in which the direction of observation 501 is located.

In this embodiment, the direction of observation 501 is defined by the gaze direction of an observer 202 placed in an observation space 110a. This direction of observation 501, in our example, is determined in particular by way of data from sensors integrated into a virtual reality headset 201 worn by the observer 202. This headset 201 comprises both a control device and a viewing device.

Figure 3:
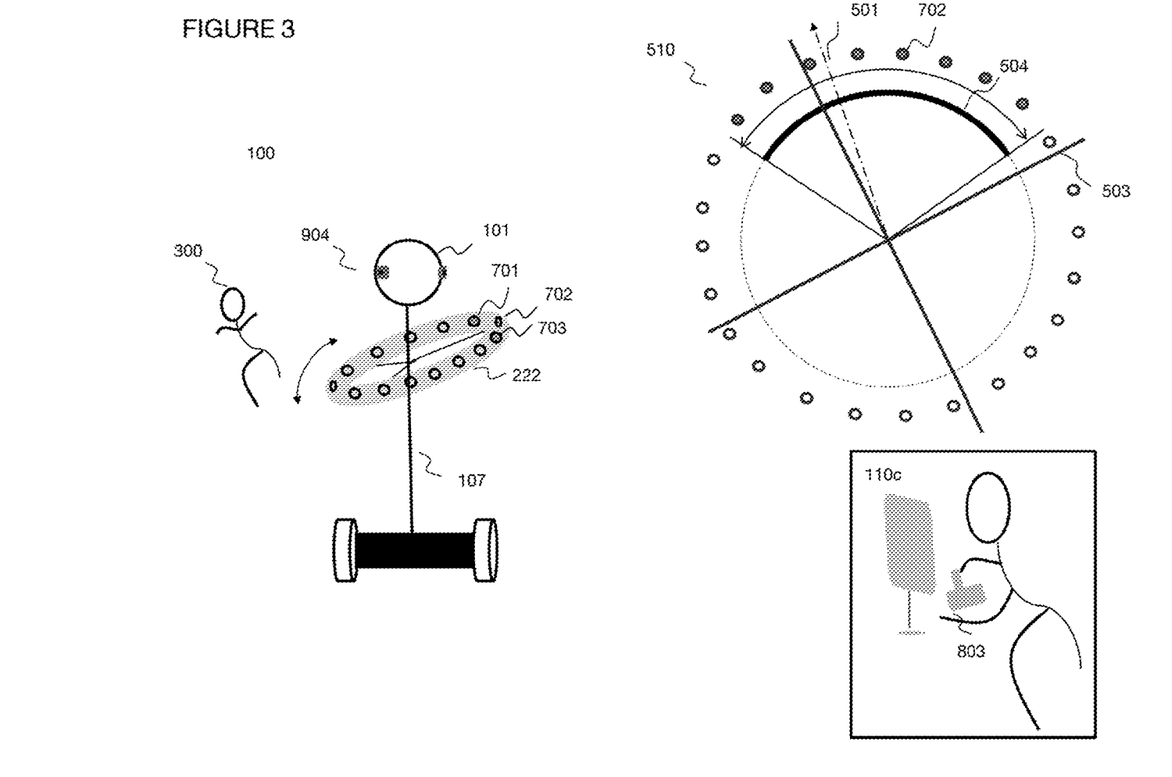
FIG. 3 illustrates an equipment incorporating a signaling device formed of a motorized support over a plurality of degrees of freedom.

As an alternative, a control device may also take the form of a virtual reality headset coupled to an interaction controller, for example of HTC Vive (registered trademark) or Oculus (registered trademark) type; the observer then directs himself and moves in the virtual scene by way of his head movements (gaze direction), and possibly by manipulating an interaction controller such as an element referenced 803 in FIG. 3. In one particular embodiment, the real movements of the interaction controller are represented in the form of a laser beam through a viewing device. The observer also directs this beam in order to "zoom in" on a particular element in the observed space.

As an alternative, a control device may also be a device equipped with sensors (gyroscope, accelerometer, infrared camera, a plurality of cameras, etc.) in order to calculate the distances in a space, etc. in order to interpret the movements of the observer.

Figure 4:
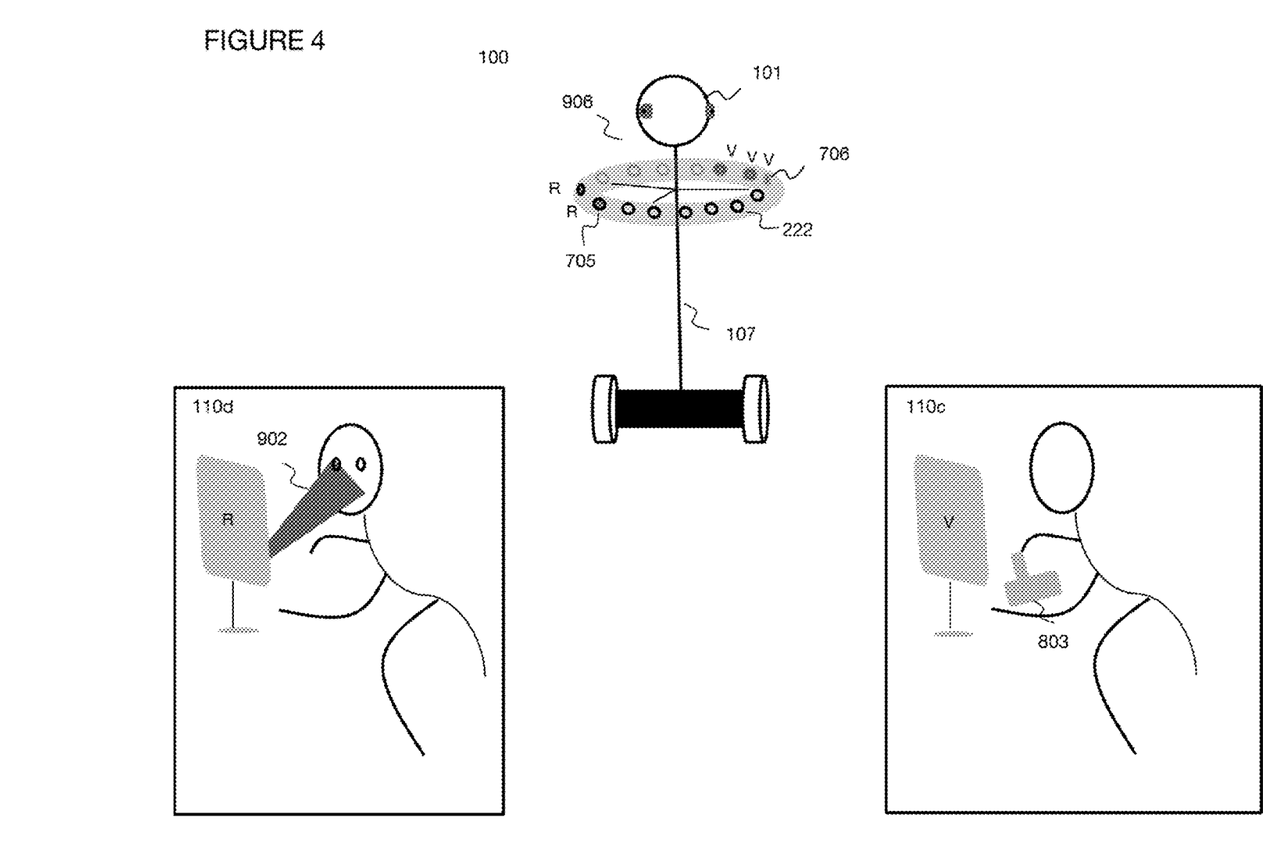
FIG. 4 illustrates an equipment incorporating a signaling device signaling at least two fields of observation relative to two different observations.

As an alternative, a control device may also be an eye-tracking device, such as the element referenced 902 in FIG. 4.

In this embodiment, the virtual reality headset 201 is also equipped with a screen on which the representation of the observed space appears. As an alternative, a similar viewing device may also be a holographic-glasses, tablet, smartphone, etc. device. According to one embodiment, a viewing device may broadcast content currently being viewed to another screen-type viewing device, such as the element 601 in FIG. 2.

The diagram 500 illustrates the horizontal projection of the various data managed by the signaling method. The direction of orientation 501 of the observer 202 is contained within a sector 505 associated with the indicator 106. The indicator light 106 is therefore activated for as long as the direction of observation 501 is contained within the sector 505. The field of observation determined for the observer 202 is represented by a circular arc referenced 502.

In this embodiment, the signaling device 102 in particular comprises a support allowing light rays to pass through, for example a transparent or even translucent support. In this way, the light signal emitted by each of the indicator lights is perceptible regardless of the position of the observed party 300 in the observed space 100. For example here, the observed party 300 is not observed by the observer 202, but the observed party is able to interpret, from his position in the observed space, the observation sector of around 90° comprising the direction of observation of the observer 202, by virtue of the transparency of the materials used for the support and by virtue of the indicator lights visible on either side of the support.

Figure 2:
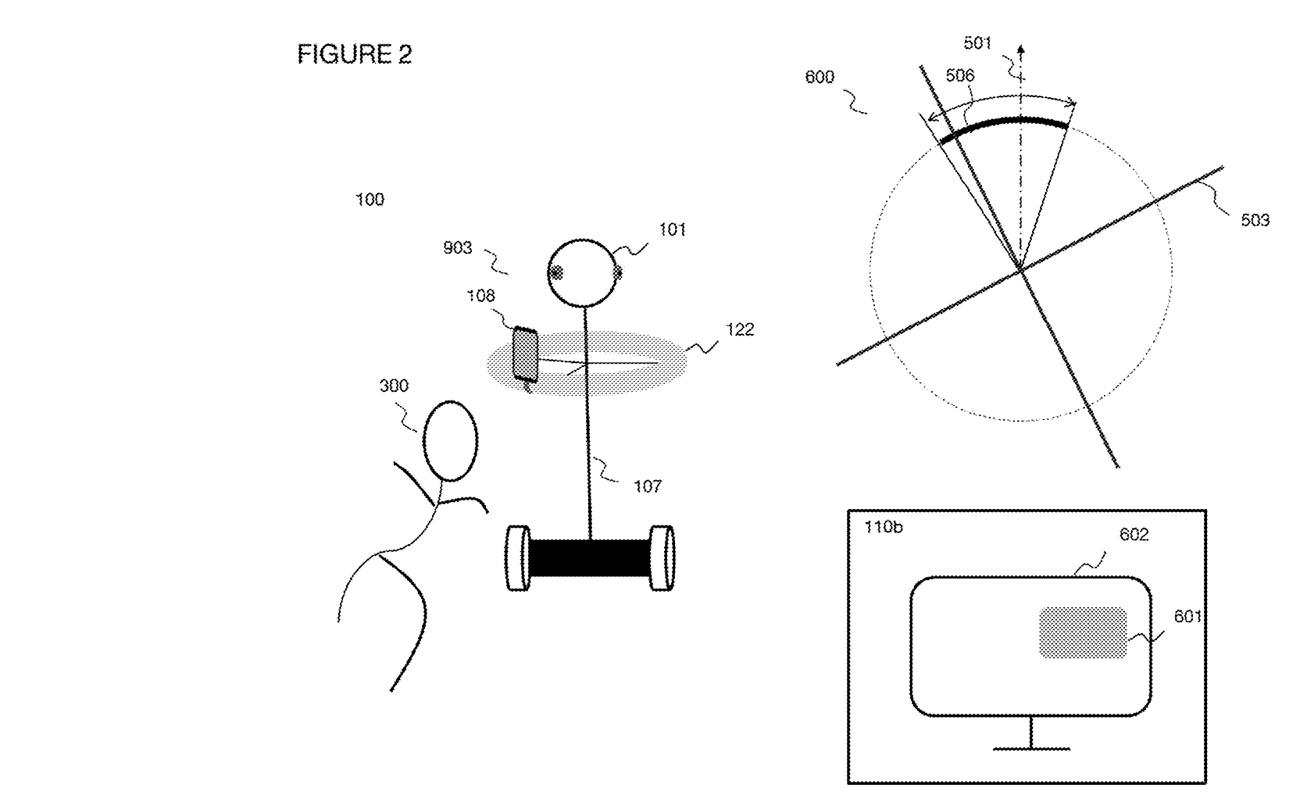
FIG. 2 illustrates an equipment incorporating a signaling device formed of a screen for viewing a field of observation.

FIG. 2 illustrates an equipment 903 describing another embodiment of the device for signaling a field of observation as described by the invention. The equipment 903 is formed of a signaling device 122, of a capturing device 101 and of a base 107. The signaling device 122 is formed of a screen 108 and of a support on which this screen is positioned. The horizontal circular support is capable of performing a rotation about its vertical axis of symmetry. As an alternative, the screen 108 moves on the horizontal support which, for its part, remains fixed. The base 107 on which the device 122 rests has casters, or other devices allowing the base to move, and moves in the observed space 100. A panoramic ordinary capturing device 101 is also positioned on this base 107.

In this embodiment, the screen 108 displays all or part of the field of observation under consideration of an observation space 110b. On a viewing device 602, there is configured for example a viewing window 601 on which a field of observation relative to the element 506 in the diagram 600 is displayed. The field of observation referenced 506 cannot be correlated with the field of view similar to that of a human: it may therefore be sized in particular in accordance with user settings.

In this embodiment, the circular support of the device 122 performs a rotation according to the change in the direction of observation 501 controlled from an observation space 110b. If the observed party referenced 300 is positioned facing the screen 108, the observed party is therefore visible from the observation space 110b. Likewise, the observed party 300 sees himself on the screen 108, and all or part of the content displayed on the window 601, depending on settings performed using the method described here.

FIG. 3 illustrates an equipment 904 describing another embodiment of the device for signaling a field of observation as described by the invention. The equipment 904 is formed of a signaling device 222, of a capturing device 101 and of a base 107. The signaling device 222 is formed of a set of indicator lights including 701 (activated), 702 (activated) and 703 (activated), and of a circular support capable of performing a rotation about its vertical axis of symmetry and about a large number of its horizontal axes of symmetry, up to around 90°. The base 107 on which the device 222 rests has casters, or other devices allowing the base to move, and moves in the observed space 100. A panoramic ordinary capturing device 101 is also positioned on this base.

In this embodiment, the signaling device 222 signals a field of observation by activating some of the indicators (701, 702, 703) from among a set of indicators representing a division of the observed space. A plurality of indicator lights may activate at the same time in order to signal a field of observation; the number of activated indicators may vary.

In the diagram 510 illustrating a projection, in the plane of the device 222, of various data managed by the signaling method, a field of observation relative to the circular arc referenced 504 is associated with the direction of observation 501 controlled from an observation space 110c: all of the indicator lights contained in the field of observation 504 are activated.

In this embodiment, the vertical component of the direction of observation is also signaled by an incline of the support of the signaling device 222. The incline of the support of the signaling device 222 is in particular identical to an incline produced from a control device 803 located in the observation space 110c.

FIG. 4 illustrates an equipment 906 describing another embodiment of the signaling device signaling two separate fields of observation. The equipment 906 is formed of a signaling device 222, of a capturing device 101 and of a base 107. The signaling device 222 is formed of a set of indicator lights including 705 (activated) and 706 (activated), and of a horizontal circular support. The base 107 on which the device 222 rests has casters, or other devices allowing the base to move, and moves in the observed space 100. A panoramic ordinary capturing device 101 is also positioned on this base.

In this embodiment, there are two observation spaces 110d and 110c in which people having a device for controlling the camera 101, respectively an eye-tracking device 902 and a joystick 803, are located. Eye-tracking device is understood to mean a hardware and software device for tracking the eye movements of a person in order to track the travel and the points at which the gaze thereof is fixed in an environment, in particular through content viewed on a screen; this control device is based on a direction of observation of an observer located in the observation space 110d in order to control a display of the content captured by the capturing device in this direction of observation on this screen.

In this embodiment, the signaling device 222 uses in particular differently colored visual indicators to signal each of the fields of observation relative to the spaces 110d and 110c. The indicator lights such as the indicator 705 are red in color (referenced "R"), and signal a first field of observation controlled from the observation space 110d, and the indicators such as the indicator 706 are green in color (referenced "V"), and signal a second field of observation controlled from the observation space 110c. In this particular embodiment, if a common indicator is necessary to signal the two fields at the same time, this indicator may adopt the color yellow. As an alternative, two different types of sensorial indicator may be used.

Figure 5A:
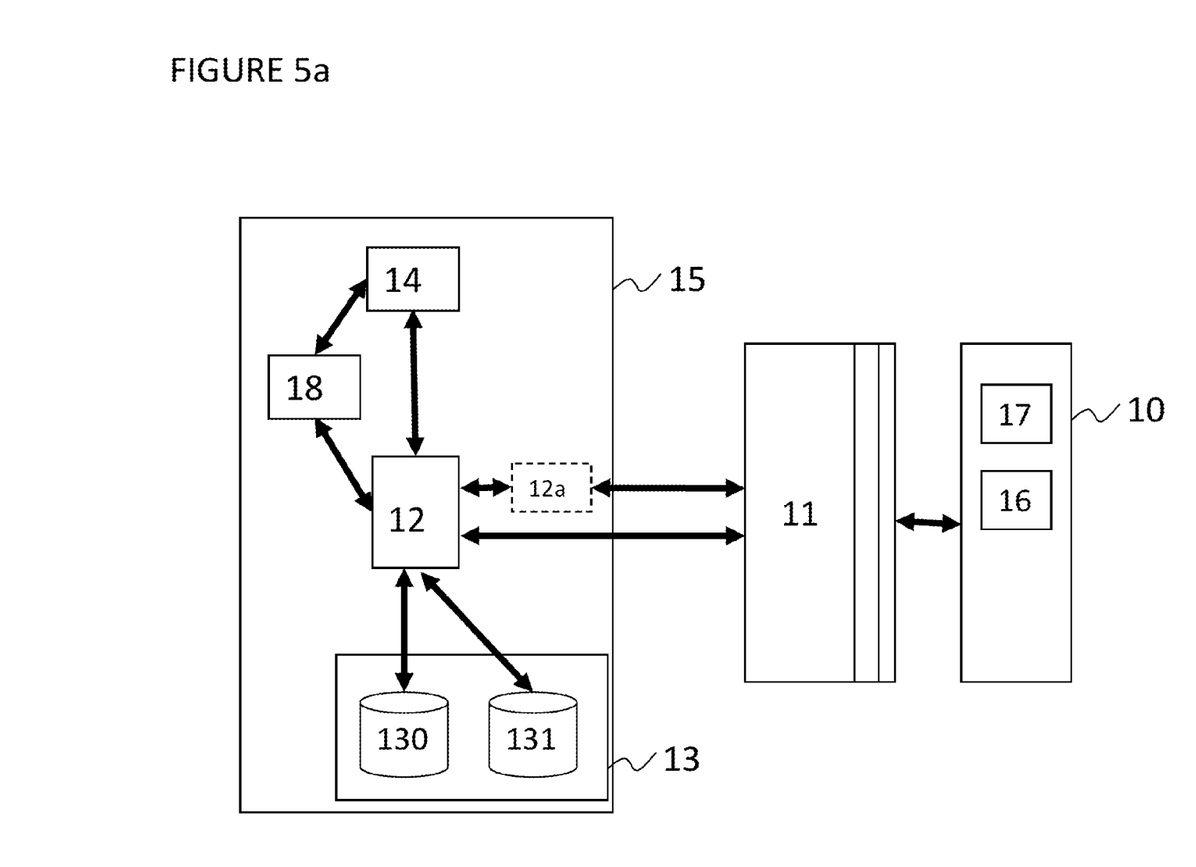
FIG. 5a schematically illustrates an environment for implementing the invention according to one particular embodiment of the invention.

FIG. 5a schematically illustrates an environment for implementing the invention according to one particular embodiment of the invention. Consideration is given to an infrastructure 15, called signaling infrastructure, of a signaling device to which a client application 10 is connected via a communication network.

For example, the client application 10 is a set of programs integrated into a virtual reality glasses device, offering in particular a module 16 for viewing audiovisual content captured by a capturing device, and a control module 17 for controlling a direction of observation through this captured content.

The signaling infrastructure 15 comprises:
  a signaling module 14 designed to signal a field of observation on the basis of a description model describing the parameters of signs based on sensorial indicators,
  a detection module 18 designed to signal a moving entity in a given field of observation;
  an acquisition module 12a designed to acquire a direction of observation from data received from the client application 10,
  a determination module 12 designed to determine a field of observation depending on a direction of observation and on a determination model describing the parameters of fields of observation,
  a set 13 of storage modules, comprising at least one database 130 in which determination models associated with fields of observation are stored, and a database 131 in which description models associated with signs are stored.

The determination module 12 is configured so as to communicate with the acquisition module 12a, the signaling module 14 and the detection module 18. These last two modules may also communicate with one another.

The acquisition module 12a and determination module 12 are configured so as to communicate with the client application 10 through a communication channel via one or more user interfaces 11, called interface 11, in particular the interface of the viewing module 16 or the interface of the control module 17 of the client application 10; the acquisition module 12a listening for notifications on the channel from the interface 11.

The principle of the invention is described here in the case of a client application 10 in relation to virtual reality glasses; the invention also applies to other types of client application.

Figure 5B:
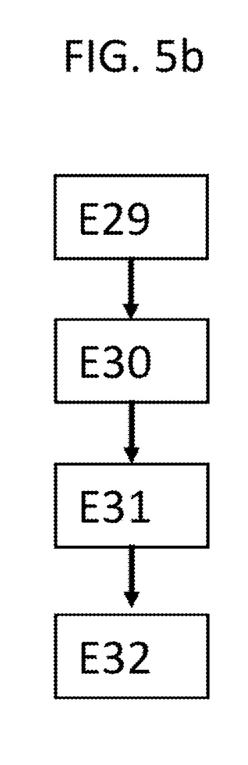

FIG. 5b illustrates steps of the signaling method according to one particular embodiment of the signaling method described with reference to FIG. 5a.

When the client application 10 sends data, in a step E29, it transmits data, in particular characterizing a direction of observation, comprising for example the spatial coordinates of this direction, to the interface 11. In step E29, the acquisition module 12a receives a notification from the interface 11 indicating these characteristics.

In a step E30, the acquisition module 12a transmits a direction of observation, in particular in relation to the respective locations of the capturing and representation devices in the observed space, to the determination module 12.

In a step E31, the determination module 12 determines a field of observation associated with the direction of observation, for example on the basis of data from the database 130 comprising determination models such as the model of the field of view of a human, and on the basis of specific data linked to the context of the observed space and/or of the observation space (environmental constraints, observed party and/or observer choice, settings of the capturing, viewing, control devices, etc.) and received from the client application 10.

In a step E32, the determination module 12 communicates the results of the determination of the field of observation to the signaling module 14. The signaling module 14 then activates the sensorial indicators corresponding to the determined field of observation, for example on the basis of data from the database 131 comprising signaling models.

As an alternative, in step E32, the determination module 12 also communicates the results of the determination of the field of observation to the detection module 18, which continuously transmits signals looking out for the occurrence of movements in the determined field of observation. In the event of detection, the detection module 18 sends a notification to the signaling module 14. The signaling module 14 then activates the sensorial indicators corresponding to the detection of movements. As an alternative, the detection module 18 also sends a notification to the determination module 12, which returns a notification to the client application 10 in order to signal, to the observer, that a movement has been detected in its field of observation.

Figure 5C:
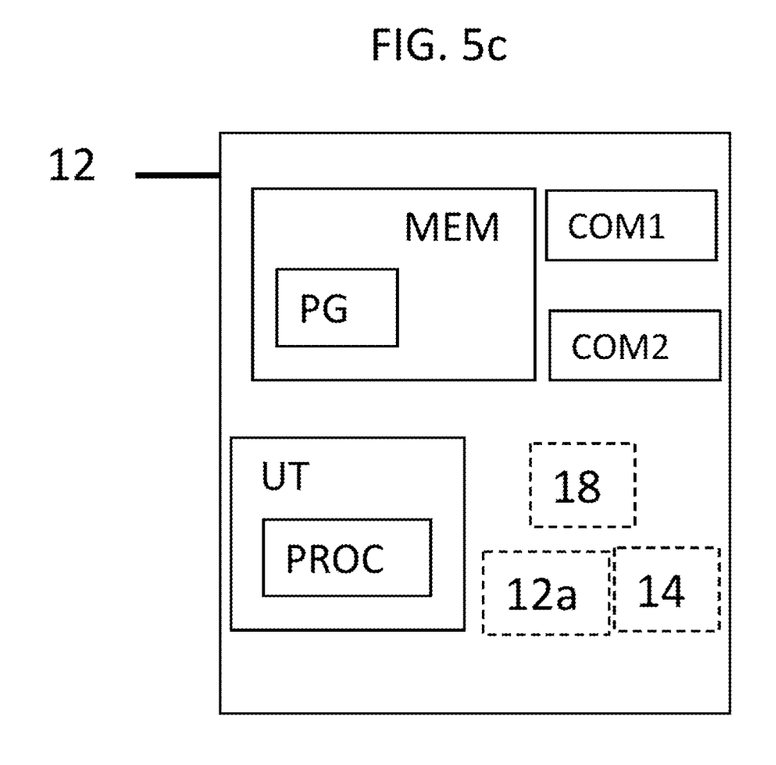
FIG. 5c illustrates a device designed to implement the method for signaling a field of observation.

FIG. 5c illustrates a device designed to implement the method for signaling a field of observation according to one particular embodiment of the invention described above. The device corresponds to the determination module 12 of the signaling infrastructure 15 of FIG. 5a.

The determination device 12 comprises in particular a memory MEM, a processing unit UT, equipped for example with a processor PROC, and driven by the computer program PG stored in memory MEM. The computer program PG comprises instructions for implementing the steps of the signaling method such as described above when the program is executed by the processor PROC.

On initialization, the code instructions of the computer program PG are for example loaded into a RAM memory, before being executed by the processor PROC. The processor PROC of the processing unit UT in particular implements the steps of the signaling method described with reference to FIG. 5b, in accordance with the instructions of the computer program PG.

To this end, the determination device 12 comprises a communication interface COM1 designed to transmit or receive notifications to or from the interface 11, in accordance with the instructions of the computer program PG. As a variant, all or part of the interface 11 may be contained within the client application 10.

The determination device 12 also comprises a communication interface COM2 designed to communicate with the set of storage modules 13.

According to one particular embodiment of the invention, the determination device 12 comprises a communication interface (not shown), such as an Ethernet, Wi-Fi or another interface, allowing the determination module 12 to connect to a communication network.

According to one particular embodiment of the invention, the determination device 12 comprises the acquisition module 12a and/or the signaling module 14 and/or the detection module 18.

The invention has been described above in the case of a signaling infrastructure 15 comprising just one signaling module, one determination module, one detection module and one acquisition module. In practice, the signaling infrastructure 15 comprises a plurality of signaling modules, a plurality of determination modules, a plurality of detection modules and a plurality of acquisition modules, in order to effectively manage the number of fields of observation to be signaled that are associated with the various observations. All of these signaling, determination, detection and acquisition modules are interconnected with the set of storage modules 13 storing determination and description models, and with synchronized user interfaces 11.

According to one particular embodiment of the invention (not shown), all or part of the signaling infrastructure 15 is contained within the capturing device.

Figure 6:
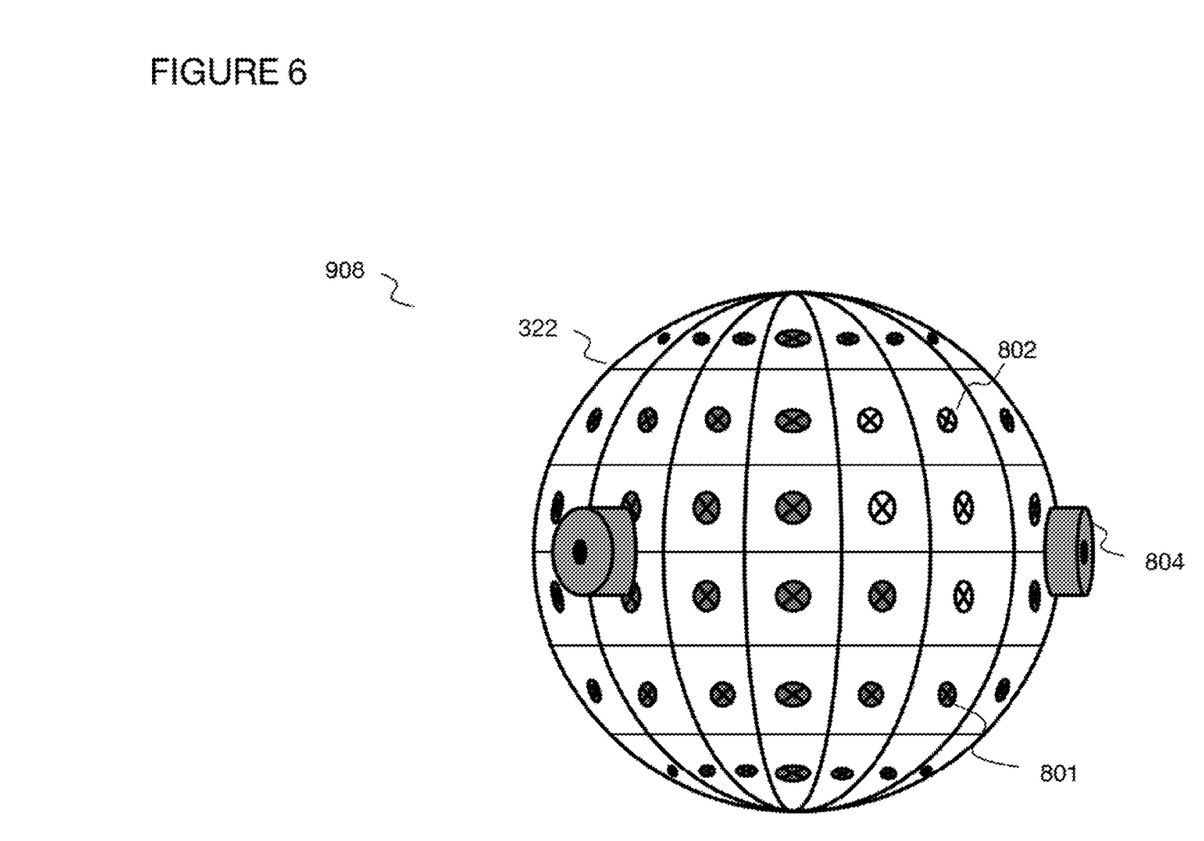
FIG. 6 illustrates an equipment incorporating a signaling device formed by a sphere covered with LED indicator lights.

FIG. 6 illustrates an equipment 908 comprising one embodiment of the device for signaling a field of observation as described by the invention. The equipment 908 is formed of a signaling device 322 and of a panoramic capturing device 804. The signaling device 322 is formed here of a sphere and of a set of indicator lights including 802 (activated) and 801 (deactivated), positioned over all or part of the sphere.

In one particular embodiment, activation of one or more indicators, such as the indicator 802, signals a solid angle relative to a field of observation. Solid angle is understood to mean the term usually used by those skilled in the art to characterize an angle in a three-dimensional space. A field of observation is thus signaled using spatial coordinates in a three-dimensional space.

Figure 7:
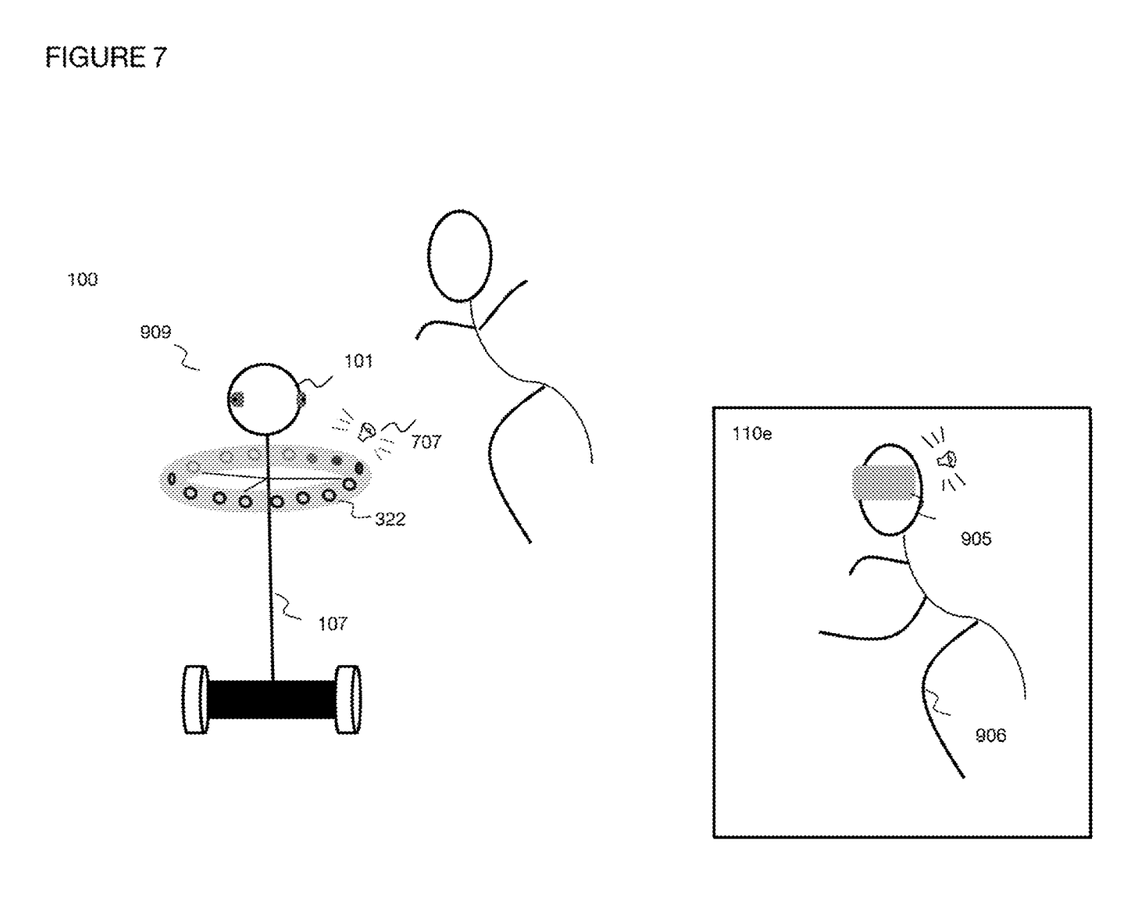
FIG. 7 illustrates an equipment incorporating a signaling device signaling the detection of a movement through a field of observation.

FIG. 7 illustrates an equipment 909 comprising another embodiment of the device for signaling a field of observation as described by the invention. The equipment 909 is formed of a signaling device 322, of a capturing device 101 and of a base 107. The signaling device 322 is formed of a set of indicator lights, of at least one audio indicator represented by 707 (activated) and of a horizontal circular support. The base 107 on which the device 322 rests has casters, or other devices allowing the base to move, and moves in the observed space 100. A panoramic ordinary capturing device 101 is also positioned on this base.

In this embodiment, the signaling device 322 signals a field of observation using a first sign based on the indicator lights. The intrusion of a moving entity into a field of observation controlled by an observer 906 located in an observation space 110e is signaled by a second sign with the aid of the signaling device 322 based, in our example, on the audio indicator 707. As an alternative, flashing of one or more indicator lights may be considered to be a second sign.

In one particular embodiment, the observer 906 receives a notification through his virtual reality headset device 905, for example an audio notification, so as to signal this detection to him.

In the present text, the modules may be implemented in the form of software, in which case it takes the form of a program able to be executed by a processor, or in the form of hardware, such as an application-specific integrated circuit (ASIC), a system on chip (SoC), or in the form of a combination of hardware elements and applications, such as for example an application program intended to be loaded and executed on an FPGA (field-programmable gate array) component.

Although they have been described through a certain number of detailed exemplary embodiments, the proposed method and the object for which the method is implemented comprise various variants, modifications and improvements that will become obviously apparent to those skilled in the art, it being understood that these various variants, modifications and improvements form part of the scope of the invention as defined by the following claims. In addition, various aspects and features described above may be implemented together or separately or else substituted with one another, and all of the various combinations and sub-combinations of the aspects and features form part of the scope of the invention. Furthermore, it may be the case that some devices and objects described above do not incorporate all of the modules and functions described for the preferred embodiments.

The invention claimed is:

1. A signaling device, able to operate in combination with a capturing device able to capture a scene of an observed space, the signaling device comprising:

a processor; and a non-transitory computer-readable medium comprising instructions stored thereon which when executed by the processor configure the signaling device to perform acts comprising:

acquiring a first direction of observation of the scene captured by the capturing device, determining a first field of observation associated with the first direction of observation, and activating at least one sensorial indicator to signal said determined first field of observation, said at least one sensorial indicator being adapted to provide a sensorial indication allowing derivation, from said observed space, of said determined first field of observation therefrom.

2. The signaling device as described in claim 1, wherein said at least one sensorial indicator comprises at least one visual indicator.

3. The signaling device as described in claim 1, wherein the instructions further configure the signaling device to acquire a first direction of observation of a device directed by an observer.

4. The signaling device as described in claim 1, wherein:

activating said at least one sensorial indicator to signal said determined first field of observation is performed on a basis of a first sign of said at least one sensorial indicator; and the instructions further configure the signaling device to activate said at least one sensorial indicator to signal a moving entity contained in the first field of observation, on the basis of a second sign of said at least one sensorial indicator.

5. The signaling device as described in claim 1, wherein the instructions further configure the signaling device to activate said at least one sensorial indicator to signal a second field of observation associated with a second direction of observation.

6. The signaling device as described in claim 1, wherein the instructions further configure the signaling device to activate said at least one sensorial indicator to signal activation of a zoom in/zoom out function.

7. The signaling device as described in claim 1, wherein said at least one sensorial indicator activated to signal the first field of observation comprises two indicators.

8. The signaling device as described in claim 1, wherein said at least one sensorial indicator activated to signal the first field of observation comprises four indicators.

9. The signaling device as described in claim 1, wherein the primary shape is circular.

10. The signaling device as described in claim 1, wherein the primary shape is spherical.

11. The signaling device as described in claim 1, wherein activating said at least one sensorial indicator to signal the determined first field of observation is performed on the basis of a first projected sign.

12. A piece of equipment comprising the signalling device of claim 1, the capturing device and a base having a three-legged stand.

13. A method associated with a signaling device, able to operate in combination with a capturing device able to capture a scene of an observed space, the method comprising the following acts performed by the signaling device:

acquiring a first direction of observation of the scene captured by the capturing device, determining a first field of observation associated with the first direction of observation, and activating at least one sensorial indicator to signal said determined first field of observation, said at least one sensorial indicator being adapted to provide a sensorial indication allowing derivation, from said observed space, of said determined first field of observation therefrom.

14. The method as described in claim 13, wherein said at least one sensorial indicator comprises at least one visual indicator.

15. The method as described in claim 13, comprising acquiring a first direction of observation of a device directed by an observer.

16. The method as described in claim 13, wherein activating said at least one sensorial indicator to signal said determined first field of observation is performed on a basis of a first sign of said at least one sensorial indicator and wherein said method comprises activating said at least one sensorial indicator to signal a moving entity contained in the first field of observation, on the basis of a second sign of said at least one sensorial indicator.

17. The method as described in claim 13, comprising activating said at least one sensorial indicator to signal a second field of observation associated with a second direction of observation.

18. The method as described in claim 13, comprising activating said at least one sensorial indicator to signal activation of a zoom in/zoom out function.

19. The method as described in claim 13, wherein said at least one sensorial indicator activated to signal the first field of observation comprises two indicators.

20. A non-transitory computer-readable data carrier on which at least one sequence of program code instructions has been stored, which when executed by a processor of a signaling device configures the signaling device to perform a method, the signaling device being able to operate in combination with a capturing device able to capture a scene of an observed space, wherein the method comprises:

acquiring a first direction of observation of the scene captured by the capturing device, determining a first field of observation associated with the first direction of observation, and activating at least one sensorial indicator to signal said determined first field of observation, said at least one sensorial indicator being adapted to provide a sensorial indication allowing derivation, from said observed space, of said determined first field of observation therefrom.

* * * * *